United States Patent
Fujita et al.

(10) Patent No.: US 9,005,857 B2
(45) Date of Patent: Apr. 14, 2015

(54) THERMOCHROMIC COLOR-MEMORIZATION TONER, CARTRIDGE INCLUDING SAME HOUSED THEREIN, IMAGE FORMATION APPARATUS, CARTRIDGE SET, AND IMAGE FORMATION APPARATUS SET

(75) Inventors: Katsuyuki Fujita, Aichi (JP); Yoshiaki Ono, Aichi (JP); Yutaka Shibahashi, Aichi (JP)

(73) Assignee: The Pilot Ink Co., Ltd., Aichi (JP)

( * ) Notice: Subject to any disclaimer, the term of this patent is extended or adjusted under 35 U.S.C. 154(b) by 0 days.

(21) Appl. No.: 13/509,663

(22) PCT Filed: Nov. 13, 2009

(86) PCT No.: PCT/JP2009/069384
§ 371 (c)(1),
(2), (4) Date: May 14, 2012

(87) PCT Pub. No.: WO2011/058652
PCT Pub. Date: May 19, 2011

(65) Prior Publication Data
US 2013/0029257 A1 Jan. 31, 2013

(51) Int. Cl.
*G03G 9/00* (2006.01)
*B43K 29/00* (2006.01)
*G03G 9/08* (2006.01)
(Continued)

(52) U.S. Cl.
CPC .............. *G03G 9/0812* (2013.01); *C09D 11/17* (2013.01); *G03G 9/0821* (2013.01); *G03G 9/0825* (2013.01); *G03G 9/0926* (2013.01); *G03G 9/0928* (2013.01)

(58) Field of Classification Search
USPC .......... 430/105, 108.1; 399/111, 252; 401/195
See application file for complete search history.

(56) References Cited

U.S. PATENT DOCUMENTS

| | | | | |
|---|---|---|---|---|
| 5,558,699 A | * | 9/1996 | Nakashima et al. | 106/31.16 |
| 2006/0112851 A1 | * | 6/2006 | Ono et al. | 106/31.16 |
| 2008/0212996 A1 | * | 9/2008 | Yokoi | 399/119 |

FOREIGN PATENT DOCUMENTS

| | | |
|---|---|---|
| JP | 1-154162 A | 6/1989 |
| JP | 6-27739 A | 2/1994 |
| JP | 8-39936 A | 2/1996 |

(Continued)

OTHER PUBLICATIONS

Machine translation of JP2009-227956, pp. 1-29.*

(Continued)

*Primary Examiner* — Thorl Chea
(74) *Attorney, Agent, or Firm* — Sughrue Mion, PLLC

(57) ABSTRACT

The present invention relates to a thermochromic color-memory toner containing: a microcapsule pigment encapsulating a thermochromic color-memory composition; and a binder resin, in which the microcapsule pigment shows a hysteresis characteristic that, in a temperature-rise process, decoloration starts when the temperature reaches $t_3$ and the pigment completely reaches a decolored state in a temperature region of $t_4$ or higher, and in a temperature-drop process, coloration starts when the temperature reaches $t_2$ and the pigment completely reaches a colored state in a temperature region of $t_1$ or lower, and $t_i$ is in a range of from −50 to 0° C. and $t_4$ is in a range of from 50 to 150° C.

12 Claims, 6 Drawing Sheets

(51) Int. Cl.
*C09D 11/17* (2014.01)
*G03G 9/09* (2006.01)

(56) References Cited

FOREIGN PATENT DOCUMENTS

| | | |
|---|---|---|
| JP | 2000-56497 A | 2/2000 |
| JP | 2000-330321 A | 11/2000 |
| JP | 2005-298746 A | 10/2005 |
| JP | 2008-233806 A | 10/2008 |
| JP | 2009-173778 A | 8/2009 |
| JP | 2009-227956 A | 10/2009 |

OTHER PUBLICATIONS

Machine translation of JP2000-330321, pp. 1-11.*
International Search Report for PCT/JP2009/069384 dated Feb. 9, 2010 [PCT/ISA/210].
Written Opinion for PCT/JP2009/069384 dated Feb. 9, 2010 [PCT/ISA/237].
Office Action dated Jun. 25, 2013, issued by the Japanese Patent Office in counterpart Japanese Patent Application No. 2011-540373.

* cited by examiner

THERMOCHROMIC COLOR-MEMORIZATION TONER, CARTRIDGE INCLUDING SAME HOUSED THEREIN, IMAGE FORMATION APPARATUS, CARTRIDGE SET, AND IMAGE FORMATION APPARATUS SET

TECHNICAL FIELD

The present invention relates to a thermochromic color-memory toner and a cartridge including the same housed therein, an image formation apparatus, a cartridge set, and an image formation apparatus set. More specifically, it relates to a thermochromic color-memory toner which can form a copied matter that can be colored and discolored due to change in temperature and can display only either state in a specific temperature region, a cartridge including the toner housed therein, an image formation apparatus, a cartridge set, and an image formation apparatus set.

BACKGROUND ART

An attempt has been disclosed to incorporate a reversibly thermochromic material having color-memorization properties in a toner (see, e.g., Patent Document 1).

With copies obtained by applying the above toner, they have the function of selectively giving a view of either of two states before and after discoloration but, in a practical use of the copies, they do not necessarily exhibit the satisfactory function of keeping the color tone in an ordinary temperature region and, at some environmental temperature in winter or summer, they in some cases fail to exhibit expected function due to discoloration of the toner itself or discoloration of the copies.

RELATED ART DOCUMENTS

Patent Documents

Patent Document 1: JP-A-2000-330321

DISCLOSURE OF THE INVENTION

Problem to be Solved by the Invention

The present invention intends to remove the defects with the above conventional toner, i.e., it intends to provide a thermochromic color-memory toner that has an excellent function of selectively keeping either of states before and discoloration, a cartridge including the toner housed therein, an image formation apparatus, a cartridge set, and an image formation apparatus set.

Means for Solving the Problems

That is, the present invention has the following constitution.
1. A thermochromic color-memory toner comprising: at least a microcapsule pigment encapsulating a thermochromic color-memory composition comprising (A) an electron donating coloring organic compound, (B) an electron accepting compound, and (C) a reaction medium controlling color reaction between the above (A) and (B); and a binder resin,
in which the microcapsule pigment shows a large hysteresis characteristic with respect to color density-temperature curve and shows alternativeness between a colored state and a decolored state,
the hysteresis characteristic is that, in a temperature-rise process where the pigment is in the colored state, decoloration starts when the temperature reaches temperature $t_3$ and the pigment completely reaches the decolored state in a temperature region of equal to or higher than temperature $t_4$ which is higher than temperature $t_3$, and, in a temperature-drop process where the pigment is in the decolored state, coloration starts when the temperature reaches temperature $t_2$ which is lower than temperature $t_3$ and the pigment completely reaches the colored state in a temperature region of equal to or lower than temperature $t_1$ which is lower than temperature $t_2$, with either the colored state or the decolored state being selectively observed visually in a temperature region between temperature $t_2$ and temperature $t_3$, and
the temperature $t_1$ is in a range of from −50 to 0° C. and the temperature $t_4$ is in a range of from 50 to 150° C.
2. The thermochromic color-memory toner according to the above 1, in which the microcapsule pigment has a hysteresis width (ΔH) of 50° C. to 100° C. with respect to the color density-temperature curve.
3. The thermochromic color-memory toner according to the above 1 or 2, in which the temperature $t_4$ of the microcapsule pigment is higher temperature than a softening point of the toner.
4. The thermochromic color-memory toner according to the above 3, in which the softening point (S) of the toner and temperature $t_4$ of the microcapsule pigment satisfy the following formula (1):

$$60° C. \leq S + 3° C. < t_4 \tag{1}$$

5. A cartridge comprising the thermochromic color-memory toner according to any one of the above 1 to 4 housed in a container.
6. An image formation apparatus comprising the thermochromic color-memory toner according to any one of the above 1 to 4 housed therein.
7. An image formation apparatus comprising the cartridge according to the above 5 housed therein.
8. A cartridge set comprising the cartridge according to the above 5; and a writing instrument which comprises in an axle body an ink composition containing a colorant capable of being decolored upon heating and which has a pen body at a front end of the writing instrument.
9. The cartridge set according to the above 8, in which the colorant capable of being decolored upon heating is a microcapsule pigment encapsulating a thermochromic color-memory composition comprising (A) an electron donating coloring organic compound; (B) an electron accepting compound; and (C) a reaction medium controlling color reaction between the above (A) and (B),
in which the microcapsule pigment shows a large hysteresis characteristic with respect to color density-temperature curve and shows alternativeness between a colored state and a decolored state,
the hysteresis characteristic is that, in a temperature-rise process where the pigment is in the colored state, decoloration starts when the temperature reaches temperature $t_3$ and the pigment completely reaches the decolored state in a temperature region of equal to or higher than temperature $t_4$ which is higher than temperature $t_3$, and, in a temperature-drop process where the pigment is in the decolored state, coloration starts when the temperature reaches temperature $t_2$ which is lower than temperature $t_3$ and the pigment completely reaches the colored state in a temperature region of equal to or lower than temperature $t_1$ which is lower than temperature $t_2$, with either the colored state or the decolored state being selectively observed visually in a temperature region between temperature $t_2$ and temperature $t_3$, and the temperature $t_1$ is in a range of from −50 to 0° C. and the temperature $t_4$ is in a range of from 50 to 150° C.

10. The cartridge set according to the above 9, in which temperature $t_4$ is in a range of from 50 to 95° C. and which further comprises a frictional member.

11. An image formation apparatus set comprising: the image formation apparatus according to the above 6 or 7; and a writing instrument which comprises in an axle body an ink composition containing a colorant capable of being decolored upon heating, and which has a pen body at a writing front end.

12. The image formation apparatus set according to the above 11, in which the colorant capable of being decolored upon heating is a microcapsule pigment encapsulating a thermochromic color-memory composition comprising (A) an electron donating coloring organic compound; (B) an electron accepting compound; and (C) a reaction medium controlling color reaction between the above (A) and (B), in which the microcapsule pigment shows a large hysteresis characteristic with respect to color density-temperature curve and shows alternativeness between a colored state and a decolored state, the hysteresis characteristic is that, in a temperature-rise process where the pigment is in the colored state, decoloration starts when the temperature reaches temperature $t_3$ and the pigment completely reaches the decolored state in a temperature region of equal to or higher than temperature $t_4$ which is higher than temperature $t_3$, and, in a temperature-drop process where the pigment is in the decolored state, coloration starts when the temperature reaches temperature $t_2$ which is lower than temperature $t_3$ and the pigment completely reaches the colored state in a temperature region of equal to or lower than temperature $t_1$ which is lower than temperature $t_2$, with either the colored state or the decolored state being selectively observed visually in a temperature region between temperature $t_2$ and temperature $t_3$, and the temperature $t_1$ is in a range of from −50 to 0° C. and the temperature $t_4$ is in a range of from 50 to 150° C.

13. The image formation apparatus set according to the above 12, in which temperature $t_4$ is in a range of from 50 to 95° C. and which further comprises a frictional member.

Advantage of the Invention

The present invention can provide a convenient thermochromic color-memory toner which can produce a reversible discoloration with showing a wide hysteresis width (ΔH) with respect to color density-temperature curve and has a function of capable of keeping the image formed on a copied matter either in a colored state or in a decolored state, a cartridge including the toner housed therein, an image formation apparatus, a cartridge set, and an image formation apparatus set.

MODE FOR CARRYING OUT THE INVENTION

The above thermochromic color-memory composition is a composition containing at least three components of (A) an electron donating coloring organic compound, (B) an electron accepting compound capable of causing coloration of the above compound, and (C) a reaction medium controlling color reaction between the above (A) and (B), and which undergoes color change such that a form of a curve obtained by plotting changes in color density with changes in temperature traces along greatly different routes between the case where the temperature is raised from the side lower than a discoloration temperature region and the case where, reversely, the temperature is lowered from the side higher than the discoloration temperature region, and which can selectively keep memory of the colored state in the low-temperature region of a complete coloring temperature ($t_1$) or lower or memory of the decolored state in the high-temperature region of a complete decoloring temperature ($t_4$) or higher in a specific temperature region [a temperature region between $t_2$ to $t_3$ (a temperature region where substantially two phases are kept)], and a microcapsule pigment containing the above composition can be applied.

A hysteresis characteristic in the color density-temperature curve of the microcapsule pigment encapsulating the above thermochromic color-memory composition will be described below.

Figure 1:
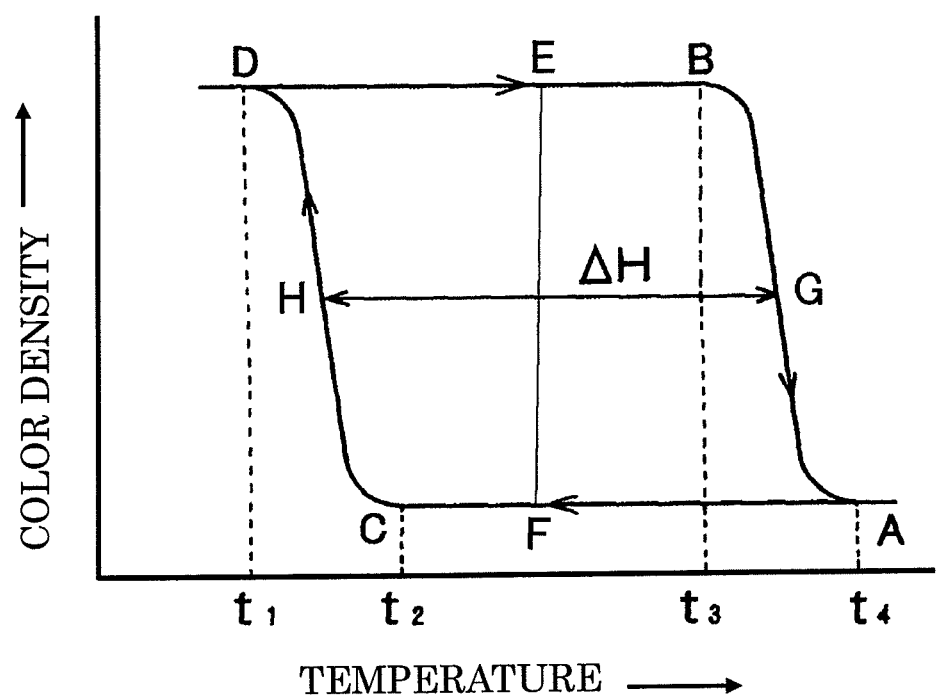
FIG. 1 is a graph showing the discoloration behavior of the microcapsule pigment containing the thermochromic color-memory composition encapsulated therein.

In FIG. 1, the color density is plotted on the ordinate and the temperature on the abscissa. A change in the color density due to a temperature change progresses along the arrow. Here, A is a point showing the density at a temperature $t_4$ at which a completely decolored state is achieved (hereinafter referred to as "complete decoloring temperature"); B is a point showing the density at a temperature $t_3$ at which decoloring starts (hereinafter referred to as "decoloring starting temperature"); C is a point showing the density at a temperature $t_2$ at which coloring starts (hereinafter referred to as "coloring starting temperature"); and D is a point showing the density at a temperature $t_1$ at which a completely colored state is achieved (hereinafter referred to as "complete coloring temperature").

The discoloration temperature region is a temperature region between $t_1$ and $t_4$ wherein both a colored state and a decolored state can coexist, and a temperature region between $t_2$ and $t_3$ wherein difference in color density is large is a substantial discoloration temperature region.

Also, the length of the line segment EF is a measure showing contrast of discoloration, and the length of the line segment HG passing through the midpoint of the line segment EF is a temperature width showing the degree of hysteresis (hereinafter referred to as "hysteresis width ΔH"). When this ΔH value is small, only specified state of both states before and after discoloration can exist in the ordinary temperature region whereas, when the ΔH value is large, it is easy to keep each state before and after discoloration.

As the discoloration temperatures, specifically, by setting the complete coloring temperature $t_1$ to a temperature that can be obtained only in a freezing compartment, a cold district, or the like, i.e., −50 to 0° C., preferably −40 to −5° C., and more preferably −30 to −10° C., and by setting the complete decoloring temperature $t_4$ to a temperature that can be obtained by a heater, i.e., 50 to 150° C., preferably 60 to 150° C., and more preferably 70 to 150° C., thereby setting the ΔH value being 50 to 100° C., function to maintain color developed in the ordinary conditions (temperature region in daily life) can be effectively exhibited.

As the component (A) of the electron donating coloring organic compound, there may be mentioned diphenylmethane phthalides, phenylindolyl phthalides, indolyl phthalides, diphenylmethane azaphthalides, phenylindolyl azaphthalides, fluorans, styrylquinolines, and diazarhodamine lactones.

Examples of these compounds are shown below.

The examples thereof include:
3,3-bis(p-dimethylaminophenyl)-6-dimethylaminophthalide;
3-(4-diethylaminophenyl)-3-(1-ethyl-2-methylindol-3-yl) phthalide;
3,3-bis(1-n-butyl-2-methylindol-3-yl)phthalide;
3,3-bis(2-ethoxy-4-diethylaminophenyl)-4-azaphthalide;
3-[2-ethoxy-4-(N-ethylanilino)phenyl]-3-(1-ethyl-2-methylindol-3-yl)-4-azaphthalide;
3,6-diphenylaminofluoran;
3,6-dimethoxyfluoran;
3,6-di-n-butoxyfluoran;
2-methyl-6-(N-ethyl-N-p-tolylamino)fluoran;
3-chloro-6-cyclohexylaminofluoran;
2-methyl-6-cyclohexylaminofluoran;
2-(2-chloroanilino)-6-di-n-butylaminofluoran;
2-(3-trifluoromethylanilino)-6-diethylaminofluoran;
2-(N-methylanilino)-6-(N-ethyl-N-p-tolylamino)fluoran;
1,3-dimethyl-6-diethylaminofluoran;
2-chloro-3-methyl-6-diethylaminofluoran;
2-anilino-3-methyl-6-diethylaminofluoran;
2-anilino-methyl-6-di-n-butylaminofluoran;
2-xylidino-3-methyl-6-diethylaminofluoran;
1,2-benz-6-diethylaminofluoran;
1,2-benz-6-(N-ethyl-N-isobutylamino)fluoran;
1,2-benz-6-(N-ethyl-N-isoamylamino)fluoran;
2-(3-methoxy-4-dodecoxystyryl)quinoline;
Spiro[5H-(1)benzopyrano(2,3-d)pyrimidine-5,1'(3'H)isobenzofuran]-3'-one;
2-(diethylamino)-8-(diethylamino)-4-methyl-spiro[5H-(1)benzopyrano(2,3-g)pyrimidine-5,1'(3'H)isobenzofuran]-3-one;
2-(di-n-butylamino)-8-(di-n-butylamino)-4-methyl-spiro[5H-(1)benzopyrano(2,3-g)pyrimidine-5,1'(3'H)isobenzofuran]-3-one;
2-(di-n-butylamino)-8-(diethylamino)-4-methyl-spiro[5H-(1)benzopyrano(2,3-g)pyrimidine-5,1'(3'H)isobenzofuran]-3-one;
2-(di-n-butylamino)-8-(N-ethyl-N-i-amylamino)-4-methyl-spiro[5H-(1)benzopyrano(2,3-g)pyrimidine-5,1'(3'H)isobenzofuran]-3-one;
3-(2-methoxy-4-dimethylaminophenyl)-3-(1-butyl-2-methylindol-3-yl)-4,5,6,7-tetrachlorophthalide;
3-(2-ethoxy-4-diethylaminophenyl)-3-(1-ethyl-2-methylindol-3-yl)-4,5,6,7-tetrachlorophthalide;
3-(2-ethoxy-4-diethylaminophenyl)-3-(1-pentyl-2-methylindol-3-yl)-4,5,6,7-tetrachlorophthalide;
3',6'-bis[phenyl(2-methylphenyl)amino]-spiro[isobenzofurane-1(3H),9'-[9H]xanthen]-3-one;
3',6'-bis[phenyl(3-methylphenyl)amino]-spiro[isobenzofurane-1(3H),9'-[9H]xanthen]-3-one; and
3',6'-bis[phenyl(3-ethylphenyl)amino]-spiro[isobenzofurane-1(3H),9'-[9H]xanthen]-3-one.

Additionally, pyridines, quinazolines and bisquinazolines compounds, which are effective for producing fluorescent yellow to red colors, are mentioned.

As the component (B) of the electron accepting compound, there may be mentioned a group of compounds having an active proton, a group of pseudo-acidic compounds (a group of compounds which are not acid but acting as acid in the composition to cause color development of the component (A)), a group of compounds having electron voids and the like.

Examples of the compounds having an active proton include monophenols and polyphenols as compounds having a phenolic hydroxyl group, those further having a substituent such as an alkyl group, an aryl group, an acyl group, an alkoxycarbonyl group, a carboxy group and an ester or amide thereof, or a halogen group, bis- or tris-phenols, and phenol-aldehyde condensed resins. In addition, the compounds may be metal salts of the above compounds having a phenolic hydroxyl group.

Specific examples are shown below.

The examples thereof include:
phenol, o-cresol, tertiary-butylcatechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 2,2-bis(4-hydroxyphenyl)propane, 4,4-dihydroxydiphenylsulfone, 1,1-bis(4-hydroxyphenyl)ethane, 2,2-bis(4-hydroxy-3-methylphenyl)propane, bis(4-hydroxyphenyl)sulfide, 1-phenyl-1,1-bis(4-hydroxyphenyl)ethane, 1,1-bis(4-hydroxyphenyl)-3-methylbutane, 1,1-bis(4-hydroxyphenyl)-2-methylpropane, 1,1-bis(4-hydroxyphenyl)-n-hexane, 1,1-bis(4-hydroxyphenyl)-n-heptane, 1,1-bis(4-hydroxyphenyl)-n-octane, 1,1-bis(4-hydroxyphenyl)-n-nonane, 1,1-bis(4-hydroxyphenyl)-n-decane, 1,1-bis(4-hydroxyphenyl)-n-dodecane, 2,2-bis(4-hydroxyphenyl)butane, 2,2-bis(4-hydroxyphenyl)ethyl propionate, 2,2-bis(4-hydroxyphenyl)-4-methylpentane, 2,2-bis(4-hydroxyphenyl)hexafluoropropane, 2,2-bis(4-hydroxyphenyl)-n-heptane and 2,2-bis(4-hydroxyphenyl)-n-nonane.

Although the above compound having a phenolic hydroxyl group can exhibit most effective thermal discoloration characteristics, a compound selected from aromatic carboxylic acids, aliphatic carboxylic acids having from 2 to 5 carbon atoms, carboxylic acid metal salts, acidic phosphoric acid esters and metal salts thereof, and 1,2,3-triazole and derivatives thereof, and the like may be used.

Further, as the component (C), a compound represented by the following general formula (1) is preferably used.

[Chem. 1]

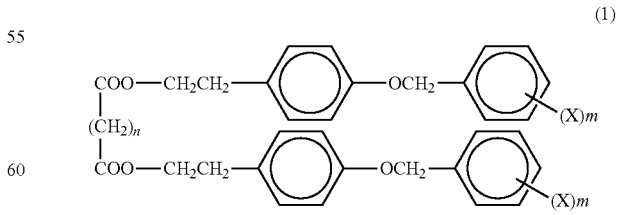

(1)

(In the formula, X represents a hydrogen atom, an alkyl group having from 1 to 4 carbon atoms, a methoxy group, or a halogen atom, m represents an integer of from 1 to 3, and n represents an integer of from 1 to 8.)

Examples of the above compound include diester of glutaric acid and 2-(4-benzyloxyphenyl)ethanol and diester of pimelic acid and 2-(4-benzyloxyphenyl)ethanol.

Also, as the component (C), a compound represented by the following general formula (2) can also be used.

[Chem. 2]

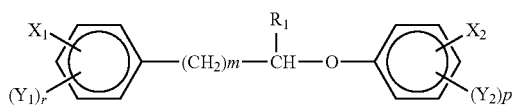
(2)

(In the formula, $R_1$ represents a hydrogen atom or a methyl group, m represents an integer of from 0 to 2, either of $X_1$ and $X_2$ represents —$(CH_2)_n OCOR_2$ or —$(CH_2)_n COOR_2$ and the other represents a hydrogen atom, n represents an integer of from 0 to 2, $R_2$ represents an alkyl group or alkenyl group having 4 or more carbon atoms, $Y_1$ and $Y_2$ each represents a hydrogen atom, an alkyl group having from 1 to 4 carbon atoms, a methoxy group, or a halogen atom, and r and p each represents an integer of 1 to 3.)

Of the compounds represented by the foregoing general formula (2), those compounds wherein $R_1$ represents a hydrogen atom are preferred since they provide a reversible thermochromic composition having a wider hysteresis width, and compounds wherein $R_1$ represents a hydrogen atom and m represents 0 being more preferred.

Incidentally, of the compounds represented by formula (2), compounds represented by the following general formula (3) are more preferably used.

[Chem. 3]

(3)

In the formula, R represents an alkyl group or alkenyl group having 8 or more carbon atoms, preferably represents an alkyl group having from 8 to 18 carbon atoms, and more preferably represents an alkyl group having from 8 to 13 carbon atoms.

Specific examples of the above compound include 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, and 4-benzyloxyphenylethyl tridecanoate.

Further, as the component (C), a compound represented by the following general formula (4) can also be used.

[Chem. 4]

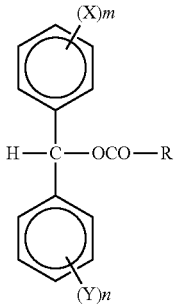
(4)

(In the formula, R represents an alkyl group or alkenyl group having 11 or more carbon atoms, m and n each represents an integer of from 1 to 3, and X and Y each represents a hydrogen atom, an alkyl group having from 1 to 4 carbon atoms, an alkoxy group having from 1 to 4 carbon atoms, or a halogen.)

Specific examples of the above compounds include 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate, and 1,1-diphenylmethyl octadecanoate.

Further, as the component (C), a compound represented by the following general formula (5) can also be used.

[Chem. 5]

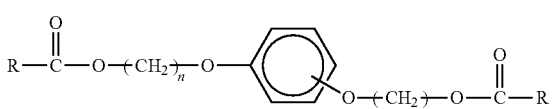
(5)

(In the formula, R represents an alkyl group or alkenyl group having from 1 to 21 carbon atoms, and n represents an integer of from 1 to 3.)

Examples of the above-described compounds include diester of 1,3-bis(2-hydroxyethoxy)benzene and caprylic acid, diester of 1,3-bis(2-hydroxyethoxy)benzene and pelargonic acid, diester of 1,3-bis(2-hydroxyethoxy)benzene and capric acid, diester of 1,3-bis(2-hydroxyethoxy)benzene and undecanoic acid, diester of 1,4-bis(hydroxymethoxy) benzene and butyric acid, diester of 1,4-bis(hydroxymethoxy) benzene and valeric acid, diester of 1,4-bis(hydroxymethoxy) benzene and isovaleric acid, diester of 1,4-bis(2-hydroxyethoxy)benzene and acetic acid, diester of 1,4-bis(2-hydroxyethoxy)benzene and propionic acid, and diester of 1,4-bis(2-hydroxyethoxy)benzene and caproic acid.

As to the shape of the above microcapsule pigment, application of microcapsule pigments with a circular cross-section is not rejected, but those with a noncircular cross-section are effective.

In the case where the microcapsule pigment has a noncircular cross-section, the pigment is scarcely destroyed by pressure or heat to be applied during the process of preparing toner or in the heat-fixing step. Also, such pigment is easily provided on the surface of a copying paper in a thin and dense state. In addition, upon application of pressure of roll in the heat-fixing step, the microcapsule pigment can properly undergo elastic deformation to relax stress, and hence it exhibits the effect of suppressing breakage of capsule wall membrane and, in the heating step, the wall membrane undergoes elastic deformation according to thermal expansion and contraction of the capsule to exhibit the effect of suppressing breakage of capsule wall membrane, whereby the contained thermochromic color-memory composition can be protected to keep the expected thermochromic function.

The above microcapsule pigment has an average particle diameter in a range of from 0.5 μm to 10 μm, preferably from 1 to 8 μm, and more preferably from 1 to 5 μm. It is preferred to satisfy the condition of the ratio of the thermochromic color-memory composition:microcapsule wall membrane=7:1 to 1:1 (in mass ratio), and preferably 6:1 to 1:1. Thereby, satisfactory color density, sensitivity of discoloration, durability against pressure and heat, and processing adaptability can be provided.

When the average particle size is less than 0.5 μm, high density coloration is difficult to realize, and strength is insufficient. On the other hand, when the average diameter exceeds 10 μm, such pigment scarcely satisfies practicality because a particle size of 15 μm or less is the practical upper limit of toner itself which is constituted by binding the pigment with a binder resin.

As a method for encapsulating the above thermochromic color-memory composition in capsules, encapsulating methods such as an interfacial polymerization method, an interfacial polycondensation method, an in situ method, and a coacervate method can be applied. In order to obtain microcapsule pigment of the above average particle diameter, the interfacial polymerization method or the interfacial polycondensation method, which scarcely causes aggregation or coalescence, is preferably used. Further, after completion of encapsulation, the resulting capsule suspension may be diluted, as needed, with water and filtered coarse particles by using a filter to thereby remove the unnecessary coarse particles.

As the filter, filtering materials such as stainless steel net, synthetic resin monofilament net, synthetic resin multifilament net, ultra-fine fiber filter, cotton cloth, unwoven cloth, needle felt, filter paper, etc. may be used alone or in an appropriate combination thereof.

A toner component such as a general-purpose binder resin is applied to the thermochromic color-memory toner of the present invention.

The content of the microcapsule pigment in the toner is from 3 to 50% by mass, preferably from 3 to 40% by mass, and more preferably from 5 to 40% by mass. When the content is less than 3% by mass, there results insufficient color density upon coloration, whereas, when the content exceeds 50% by mass, the proportion of the binder resin is so small that fixing properties of the toner is easily deteriorated.

The particle diameter of the above thermochromic color-memory toner is from 1 to 15 μm, preferably from 3 to 15 μm, and more preferably from 3 to 10 μm.

When the particle diameter of the toner is less than 1 μm, fluidity of the toner may become poor, leading to increasing possibility of problems such as background staining, whereas, when the particle diameter exceeds 15 μm, clearness of the resulting image might be spoiled in some cases.

Examples of the above binder resin include styrene type resin, vinyl chloride resin, rosin-modified maleic acid resin, chlorinated paraffin, polychlorinated paraffin, phenol resin, epoxy resin, polyester resin, polyamide resin, polyacrylic acid resin, low molecular weight polyethylene, low molecular weight polypropylene, ionomer resin, polyurethane resin, ketone resin, ethylene-ethyl acrylate copolymer, xylene resin, polyvinyl butyral, polyurea type resin, terpene resin, polyol resin, hydrogenated petroleum resin, etc. These binder resins can be used alone or in combination of two or more thereof.

The content of the binder in the toner is effectively from 30 to 97% by mass, preferably from 40 to 97% by mass, and more preferably from 45 to 95% by mass.

Incidentally, of the above resins, polyester resins having low temperature fixability are preferably used.

As the polyester resins, those which have a glass transition temperature (Tg) of 30° C. to 80° C. and preferably 40° C. to 70° C., are preferably used. When the glass transition temperature is less than 30° C., blocking resistance (preservability) might be deteriorated in some cases, whereas, when the glass transition temperature exceeds 80° C., the low temperature fixability might be spoiled in some cases.

Also, the softening point of the polyester resin is from 105° C. to 135° C., preferably from 105° C. to 130° C. When the softening point is less than 105° C., blocking resistance (preservability) might be deteriorated in some cases, whereas, when the softening point exceeds 130° C., the low temperature fixability might be spoiled in some cases.

In the case of using the polyester resin in combination with other resin as the binder resin, the content of the polyester resin in the binder resin is preferably from 50% by mass to 98% by mass. When the content is less than 50% by mass, there results poor low temperature fixability, whereas, when the content exceeds 98% by mass, offset resistance might be liable to be spoiled.

Also, a release agent, a charge-controlling agent, a fluidity-improving agent, a magnetic material, etc. may be added as needed.

Examples of the above release agent include waxes such as carbonyl group-containing wax, polyolefin wax, and long-chain hydrocarbon.

Examples of the above carbonyl group-containing wax include polyalkanoic acid esters, polyalkanol esters, polyalkanoic acid amides, polyalkylamides, and dialkylketones.

Examples of the above polyolefin wax include polyethylene wax and polypropylene wax.

Examples of the above long-chain hydrocarbon include paraffin wax and Sasol wax.

Incidentally, the melting point of the above wax is preferably lower than the temperature $t_4$ of the microcapsule pigment.

The above release agents may be used alone or in combination of two or more thereof.

As the above charge-controlling agent, a material which is colorless or has an approximately white color is preferred. Examples thereof include alkoxy amines, quaternary ammonium salts (including fluorine-modified quaternary ammonium salts), alkylamides, simple substance of phosphorus or compounds thereof, simple substance of tungsten or compounds thereof, fluorine-containing active agents, metal salts of salicylic acid, and metal salts of salicylic acid derivatives.

As the above fluidity-improving agent, organic fine powder or inorganic fine powder can be used, and examples thereof include fluorine-containing resin powders such as vinylidene fluoride fine powder, and polytetrafluoroethylene fine powder; metal salts of fatty acids such as zinc stearate, calcium stearate, and lead stearate; metal oxides such as iron oxide, aluminum oxide, titanium oxide, and zinc oxide; silica; and silica having been surface-treated with a silane coupling agent, a titanium coupling agent, a silicone oil, or the like.

Examples of the above magnetic material include magnetic powders of metals such as iron, cobalt, and nickel; magnetic powders of alloys of these metals; and magnetic powders of metal oxides.

The thermochromic color-memory toner of the present invention is formed by kneading the microcapsule pigment with the binder resin and other components, and then forming into particles with a predetermined diameter.

The softening point of the above toner is from 50 to 120° C., preferably from 60 to 100° C., and more preferably from 60 to 80° C. When the softening point is less than 50° C., blocking is liable to occur within a developing machine.

Incidentally, the complete decoloring temperature $t_4$ of the above microcapsule pigment is preferably a temperature exceeding the softening point of the toner. The reason for this is that, when the complete decoloring temperature exceeds the softening point of the toner, the microcapsule pigment is not decolored upon being fixed by softening the toner using a heating device such as heating roller after transferring the toner to a recording paper such as paper, thus the copied matter formed by using the thermochromic color-memory toner of the present invention is imparted with excellent image-forming properties.

Also, as to the above copied matter can be repeatedly used for copying because the image is decolored upon heating it to a temperature of the complete decoloring temperature $t_4$ or higher, which enables reuse of the recording paper.

In order to obtain a copied matter excellent in the above image-forming properties, the softening point (S) of the toner and the temperature $t_4$ of the above microcapsule pigment preferably satisfy the following formula (1), and more preferably satisfy the following formula (2).

$$60° C. \le S+3° C. < t_4 \quad (1)$$

$$60° C. \le S+5° C. < t_4 \quad (2)$$

In the case where the complete decoloring temperature $t_4$ of the above microcapsule pigment is a temperature equal to or lower than the softening point of the toner, it is necessary to cool the recording paper to a temperature equal to or lower than the complete coloring temperature ($t_1$) because the microcapsule pigment is decolored upon fixing the toner by softening by applying a heating device such as heating roller after transferring the toner. Virgin recording paper can be practically used by realizing the printed image by cooling but, in the case of reusing the recording paper, there arises the problem that not only the printed image but decolored images having been printed in the past appear.

Therefore, to set the temperature $t_4$ of the microcapsule pigment to a temperature which satisfies formula (1) expressing relation between the softening point (S) of the toner and the temperature $t_4$ of the above microcapsule pigment and which is higher than the softening point of the toner by 3° C. or higher is an important factor for preventing decoloration of the microcapsule due to variation of heating temperature and for reusing a recording paper.

Incidentally, as the softening point of the toner, a load of 20 kg is applied using a plunger to 1 g of a toner while heating at a temperature-increasing rate of 5° C./min using a capillary rheometer to extrude through a nozzle of 1 mm in diameter and 1 mm in length, and the temperature at which a half amount of the toner flows out is taken as the softening point.

The above toner can be practically used in such a manner of directly placing the toner in an image formation apparatus, or used in such a manner of placing the toner in a cartridge and setting the cartridge on an image formation apparatus.

As the cartridge for receiving the toner, a cartridge can be exemplified which has a electrostatic latent image carrier for carrying an electrostatic latent image and a developing means for developing the electrostatic latent image carried on the electrostatic latent image carrier using a developing agent to thereby form a visible image and which further has, as needed, a charging means, a transfer means, a cleaning means, a neutralizing means, and the like.

The above cartridge can be removably mounted on an image formation apparatus such as facsimile and printer.

Also, it is possible to combine the above cartridge and a writing instrument having an axel body receiving therein an ink composition containing a colorant which is decolored upon heating and having a pen body at a front end of the writing instrument to thereby obtain a cartridge set, or to combine the above image formation apparatus and the writing instrument having an axel body receiving therein an ink composition containing a colorant which is decolored upon heating and having a pen body at a front end of the writing instrument to thereby obtain an image formation apparatus set.

As the colorant to be contained in the ink composition of the above writing instrument, use can be made of the same microcapsule pigment as described hereinbefore that encapsulates the thermochromic color-memory composition containing (A) an electron donating coloring organic compound, (B) an electron accepting compound, and (C) a reaction medium controlling color reaction between the above (A) and (B).

Also, as the above microcapsule pigment, preferable use can be made of the pigment that shows a large hysteresis characteristic with respect to a color density-temperature curve and shows alternativeness between a color-developed state and a colorless state, in which the hysteresis characteristic is that, in a temperature-rise process where the temperature is raised from the color-developed state, decoloration starts when the temperature reaches temperature $t_3$ and the pigment completely reaches the colorless state in a temperature region of equal to or higher than $t_4$ which is higher than temperature $t_3$, and, in a temperature-drop process where the temperature is lowered from the colorless state, coloration starts when the temperature reaches temperature $t_2$ which is lower than temperature $t_3$ and the pigment completely reaches the colored state in a temperature region of equal to or higher than temperature $t_1$ which is lower than temperature $t_2$, with either the colored state or the colorless state being selectively maintained in a temperature region between temperature $t_2$ and temperature $t_3$, and in which the temperature $t_1$ is in a range of from −50 to 0° C. and the temperature $t_4$ is in a range of from 50 to 150° C.

By setting the above temperature $t_1$ to a temperature that can be obtained only in a freezing compartment, a cold district, or the like, i.e., −50 to 0° C., preferably −40 to −5° C. and more preferably −30 to −10° C., and by setting the complete decoloring temperature $t_4$ to a temperature that can be obtained by a frictional member or a heater, i.e., 50 to 150° C., preferably 60 to 150° C. and more preferably 70 to 150° C., thereby setting the ΔH value being 50 to 100° C., function to maintain color developed in the ordinary conditions (temperature region in daily life) can be effectively exhibited.

Incidentally, by setting the complete decoloring temperature $t_4$ to a temperature attainable by friction heat, i.e., in a range of from 50 to 95° C., preferably from 55 to 90° C. and more preferably from 60 to 85° C., handwriting formed on a writing-surface can be sufficiently decolored with friction heat generated by rubbing with frictional member several times.

When the complete decoloring temperature $t_4$ is a temperature exceeding 95° C., friction heat obtained by rubbing with a frictional member scarcely reaches the complete decloring temperature and, therefore, decoloration becomes so difficult that number of times of friction is increased or a too much load tends to be applied to cause scratching. Thus, there exists the possibility of damaging the writing-surface.

In the case of obtaining the above cartridge set or image formation apparatus set, a constitution with which only handwriting formed by a writing instrument is decolored with friction heat can be realized by setting the complete decoloring temperature $t_4$ of the microcapsule pigment contained in an ink of the writing instrument to a temperature lower than the complete decoloring temperature $t_4$ of the microcapsule pigment contained in the toner. In this case, the difference in temperature between the complete decoloring temperature $t_4$ of the microcapsule pigment contained in the toner and the complete decoloring temperature $t_4$ of the microcapsule pigment contained in the ink of the writing instrument is 10° C. or more, preferably 15° C. or more, and more preferably 20° C. or more.

Examples of the ink composition containing a colorant capable of being decolored upon heating include a shear thinning ink containing a shear thinning agent, and a cohesive ink in which microcapsules are suspended in a loosely cohesive state with the aid of an aqueous polymeric cohesive agent. Further, there can be mentioned an ink in which difference in specific gravity between microcapsule pigment and vehicle is adjusted to 0.05 or less.

By adding the above shear thinning agent, it is possible not only to suppress cohesion and sedimentation of the microcapsule pigment, but also to suppress spreading of the handwriting, so that a good handwriting can be formed.

Furthermore, in the case where the writing instrument filled with the above ink is a ball-point pen, it is possible to prevent a leakage of the ink from an interval between a ball and a tip when not being used, or to prevent a reverse flowing of the ink when a writing front end is disposed upward (erect state).

Examples of the shear thinning agent include xanthan gum, welan gum, succinoglycan (average molecular weight is about 100 to 8,000,000) that is an organic acid modified heteropolysaccharide of which constituent monosaccharides are glucose and galactose, guar gum, locust bean gum and a derivative thereof, hydroxyethylcellulose, an alkyl alginate ester, a polymer containing an alkyl ester of methacrylate as a main component and having a molecular weight of 100,000 to 150,000, glucomannan, a thickening polysaccharide having a gelation ability extracted from seaweeds such as agar or carrageenin, benzyliden sorbitol and benzyliden xylitol or a derivative thereof, a crosslinking acrylic acid polymer, an inorganic fine particulate, polyglycerine fatty acid ester, polyoxyethylene sorbitan fatty acid ester, polyethylene glycol fatty acid ester, polyoxyethylene alkyl ether, polyoxypropylene alkyl ether, polyoxyethylene alkyl phenyl ether, a nonionic surfactant such as fatty acid amide having a HLB value of 8 to 12, salts of dialkyl or dialkenyl sulfosuccinate, a mixture of N-alkyl-2-pyrrolidone and a anionic surfactant, and a mixture of polyvinylalcohol and an acrylic resin.

As the aqueous polymeric cohesive agent, there may be mentioned polyvinyl pyrrolidone, polyethylene oxide, aqueous polysaccharide, and aqueous cellulose derivatives. Specific examples of the aqueous polysaccharide include tragacanth gum, par gum, pullulan, and cyclodextrin. Specific examples of the aqueous cellulose derivative include methylcellulose, hydroxyethyl cellulose, hydroxypropyl cellulose, hydroxyethylmethyl cellulose, and hydroxypropylmethyl cellulose.

Although any kind of aqueous polymeric cohesive agents that exhibit activity to produce loose bridging between pigment particles can be applied to the above ink, the aqueous cellulose derivative has most effective activity.

The aqueous polymeric cohesive agent can be blended in a range of 0.05 to 20% by mass in total ink composition.

An aqueous organic solvent can be added as needed into the ink together with water.

Examples of the organic solvent include ethanol, propanol, butanol, glycerine, sorbitol, triethanolamine, diethanolamine, monoethanolamine, ethyleneglycol, diethyleneglycol, thiodiethyleneglycol, polyethyleneglycol, propyleneglycol, butyleneglycol, ethyleneglycol monomethyl ether, ethyleneglycol monoethyl ether, ethyleneglycol monobutyl ether, diethyleneglycol monomethyl ether, diethyleneglycol monoethyl ether, diethyleneglycol monobutyl ether, propyleneglycol monobutyl ether, ethyleneglycol monomethyl ether acetate, sulfolane, 2-pyrrolidone, N-methyl-2-pyrrolidone.

Moreover, in the case where the ink is used with being filled in a ball-point pen, it is preferable that the abrasion of a ball receiving sheet is prevented by adding lubricants including higher fatty acids such as oleic acid, non-ionic surfactants having a long chain alkyl group, polyether modified silicone oil, thiophosphorous acid triesters such as thiophosphorous acid tri(alkoxycarbonyl methyl ester) or thiophosphorous acid tri(alkoxycarbonyl ethyl ester), phosphoric acid monoester of polyoxyethylene alkyl ether or polyoxyethylene alkylaryl ether, phosphoric acid diester of polyoxyethylene alkyl ether or polyoxyethylene alkylaryl ether, and metal salts, ammonium salts, amine salts, and alkanolamine salts thereof.

In addition, if necessary, resins such as acryl resins, a styrene-maleic acid copolymer, a cellulose derivative, polyvinyl pyrrolidone, polyvinyl alcohol, and dextrin may be added to impart a fixing property to the surface of the paper or viscosity.

In addition, there can be added inorganic salts such as sodium carbonate, sodium phosphate, and sodium acetate; pH controlling agents such as an organic basic compound such as an aqueous amine compound; an anticorrosive agents such as benzotriazole, tolyltriazole, dicyclohexylammonium nitrite, diisopropylammonium nitrite, and saponin; antiseptics or antifungal agents such as phenic acid, a sodium salt of 1,2-benzthiazoline 3-one, sodium benzoate, sodium dihydroacetate, potassium sorbate, paraoxypropylbenzoate, and 2,3,5,6-tetrachloro-4-(methylsulfonyl)pyrridin; wetting agents such as urea, non-ionic surfactants, a reduced or non-reduced starch hydrolysate, oligosaccharides such as trehalose, sucrose, cyclodextrin, glucose, dextrin, sorbitol, mannitol, and sodium pyrophosphate; antifoaming agents; dispersants; and fluorine-based surfactants or non-ionic surfactants for improving permeability of inks.

A writing instrument can be obtained by filling the above ink into an instrument such as ball-point pen or marking pen that has a marking pen tip or ball-point pen tip mounted on a writing front end.

The structure and shape of the ball-point pen are not particularly limited. Examples thereof includes a ball-point pen having an ink receiving tube in which a shear thinning ink is filled in an axle body, in which the ink receiving tube is connected with a tip where a ball is mounted on its front end, and a liquid plug for preventing reverse flowing is closely contacted in the edge of the ink.

The ball-point pen tip will be explained in more detail. There can be applied a tip formed by holding a ball in a ball holding part in which the vicinity of a front end of a metal pipe is pressed and deformed inwardly from the outside; a tip formed by holding a ball in a ball holding part formed by cutting a metal material by a drill and the like; a tip in which a ball receiving sheet made of a resin is provided in the tip made of metal or plastic; or a tip in which a ball held in the tip is pressed in a front direction by a spring body.

The ball made of cemented carbide, stainless steel, ruby, ceramic, resin, rubber, and the like, and having a diameter of about 0.3 to 3.0 mm, preferably 0.3 to 1.5 mm, and more preferably 0.4 to 1.0 mm can be applicable.

As the ink receiving tube receiving ink, for example, a molded body formed of a thermoplastic resin such as polyethylene, polypropylene, polyethylene terephthalate, and nylon can be used.

In addition to the direct connection of the tip to the ink receiving tube, the ink receiving tube and the tip may be connected through a connection member (holder).

Incidentally, the ink receiving tube may be a refill type in which the refill is received into an axle body made of a resin or metal, or the ink may be directly filled in an axle body in which the axle body mounting a tip in the front end thereof is used itself as an ink receiving body.

An ink follower is filled in a rear end of ink received in the ink receiving tube.

The composition of the ink follower includes a non-volatile liquid or a hardly volatile liquid.

Specific examples thereof include vaseline, spindle oil, castor oil, olive oil, mineral oil refineries, liquid paraffine, polybutene, α-olefine, oligomer or cooligomer of α-olefine, dimethyl silicone oil, methylphenyl silicone oil, amino modified silicone oil, polyether modified silicone oil, and fatty acid modified silicone oil. It can be used alone or in combination of two or more thereof.

It is preferable that the viscosity of the non-volatile liquid and/or the hardly volatile liquid is increased to a suitable viscosity by adding a thickening agent. Examples of the thickening agent include silica having hydrophobic treated surface; particulate silica having a methylated surface; aluminum silicate; swellable mica; a clay-based thickening agent such as hydrophobic treated bentonite or montmorillonite; fatty acid metal soaps such as magnesium stearate, calcium stearate, aluminum stearate, and zinc stearate; tribenzylidene sorbitol; fatty acid amide; amide modified polyethylene wax; hydrogenated castor oil; a dextrin-based compound such as fatty acid dextrin; and a cellulose-based compound.

The liquid ink follower may be used in combination with a solid ink follower.

In the case where the ink is filled in a marking pen, the structure and shape of the marking pen are not particularly limited. Examples thereof include a marking pen in which an ink occlusion body formed of a fiber bundle is embedded in an axle body, a marking pen tip formed of a processed fiber having a capillary gap therein is mounted directly or via a connection member (holder) on the axle body, and a cohesive ink is impregnated in the ink occlusion body of the marking pen formed by connecting the ink occlusion body and the tip, or a marking pen in which a tip and an ink receiving tube are arranged through a valve body that opens by pressing the pen-front and the ink is directly received in the ink receiving tube.

The tip is a generally known porous member having communication pores of which porosity is selected within the range of about 30 to 70%, made of processed resin of fibers, fusion processed bodies of hot-melt fiber, or a felt, and the tip is provided for practical use by processed its one end into a form depending on the purpose, such as a cannonball form, a rectangular form, or a chisel.

The ink occlusion body is configured by bundling crimped fibers in a length direction, incorporating the fibers into a covering material such as a plastic tube or a film, and adjusting its porosity within a range of about 40 to 90%.

As the valve body, use can be made of a generally known pumping type, and also preferable one is those which a spring pressure of is adjusted so as to enable the valve open by pen pressure.

The shape of the writing instrument is not limited to the shapes mentioned above, and may be a multiple writing instrument (i.e., a both head type or a pen-front drawing type) in which tips of different type are provided or tips for introducing inks of different colors are provided.

The handwriting obtained by writing on a writing-surface using the above writing instrument can be discolored by heating.

As heating means, a drier or a finger rubbing method can be used, but it is preferable that discoloration is instrumented by friction using a frictional member.

As the frictional member, an elastic member such as an elastomer or a plastic foamed body, which has a good elasticity and can generate friction heat by an appropriate friction is preferable. However, a plastic molded body, stone, wood, metal, and cloth may be used as well.

Examples of a material of the frictional member include a silicone resin, SBS resin (styrene-butadiene-styrene copolymer), and SEBS resin (styrene-ethylene-butylene-styrene block copolymer).

By fixing the frictional member to the writing instrument, portability is improved.

The position at which the frictional member is fixed is not particularly limited, and there can be mentioned a front end of a cap (top part), or a front end of an axle body (portion in which a writing front end is not provided).

Also, the above writing instrument can be combined with another frictional member.

EXAMPLES

Examples will be described below. Incidentally, parts in Examples are parts by mass.

Example 1

Preparation of Reversible Thermochromic Microcapsule Pigment

A solution obtained by uniformly dissolving under heating a thermochromic color-memory composition composed of 4.5 parts of 2-(2-chloroamino)-6-dibutylaminofluoran as component (A), 5.0 parts of 2,2-bis(4'-hydroxyphenyl)hexafluoropropane as component (B) and 50 parts of diester of pimelic acid and 2-(4-benzyloxyphenyl)ethanol as component (C) and blending 25.0 parts of an aromatic polyvalent isocyanate prepolymer as a wall membrane material and 50.0 parts of a co-solvent was emulsified and dispersed in a 8% polyvinyl alcohol aqueous solution into fine droplets, followed by continuous stirring under heating, and 2.5 parts of a water-soluble aliphatic modified amine was added thereto, followed by further continuous stirring to obtain a microcapsule pigment suspension.

The resulting suspension was subjected to centrifugation to isolate the microcapsule pigment.

The above microcapsule pigment has an average particle diameter of 2.5 µm, a complete decoloring temperature of 77° C., and a complete coloring temperature of −12° C., and undergoes discoloration from black to colorless due to change in temperature.

Preparation of Thermochromic Color-Memory Toner

After blending 15 parts of the above microcapsule pigment, 100 parts of a polyester resin having a softening point of 70° C. as a binder resin, and 3 parts of low molecular weight polyethylene as a release agent, the resulting mixture was melt-kneaded in a twin-screw extruder at a kneading temperature of 90° C. Then, the product was solidified by cooling, followed by pulverizing and classifying to obtain a thermochromic color-memory toner having a particle diameter of 7 μm. The toner particles had a softening point of 73° C.

Formation of Copied Matter

The above thermochromic color-memory toner (previously cooled to develop the color of the microcapsule pigment) was placed in a cartridge.

The cartridge was set in a laser printer, and a document for meeting was copied to form a thermochromic image, whereby a thermochromic copied matter was obtained.

The copied matter was visually confirmed to carry thereon a black thermochromic image at room temperature (25° C.). The thermochromic image was decolored upon heating to a temperature of 77° C. or higher and, at a room temperature (25° C.), the copied matter returned to the state before use (recording paper on which nothing is copied).

Again, a copied matter can be obtained by setting the recording paper in the laser printer and conducting copying procedures to thereby form a thermochromic image, whereby the recording paper was able to be used repeatedly.

Example 2

Preparation of Reversible Thermochromic Microcapsule Pigment

A solution obtained by uniformly dissolving under heating a thermochromic color-memory composition composed of 1.5 parts of 2-(dibutylamino)-8-(dipentylamino)-4-methyl-spiro[5H-[1]benzopyrano[2,3-g]-pyrimidine-5,1'(3'H)-isobenzofuran]-3-one as component (A), 5.0 parts of 2,2-bis(4'-hydroxyphenyl)hexafluoropropane as component (B), and 50 parts of diester of pimelic acid and 2-(4-benzyloxyphenyl)ethanol as component (C) and blending 25.0 parts of an aromatic polyvalent isocyanate prepolymer as a wall membrane material and 50.0 parts of a co-solvent was emulsified and dispersed in a 8% polyvinyl alcohol aqueous solution into fine droplets, followed by continuous stirring under heating, and 2.5 parts of a water-soluble aliphatic modified amine was added thereto, followed by further continuous stirring to obtain a microcapsule pigment suspension.

The resulting suspension was subjected to centrifugation to isolate the microcapsule pigment.

The above microcapsule pigment has an average particle diameter of 2.5 μm, a complete decoloring temperature of 78° C., and a complete coloring temperature of −11° C., and undergoes discoloration from pink to colorless due to change in temperature.

Preparation of Thermochromic Color-Memory Toner

After blending 15 parts of the above microcapsule pigment, 100 parts of a polyester resin having a softening point of 70° C. as a binder resin, and 3 parts of low molecular weight polyethylene as a release agent, the resulting mixture was melt-kneaded in a twin-screw extruder at a kneading temperature of 90° C. Then, the product was solidified by cooling, followed by pulverizing and classifying to obtain a thermochromic color-memory toner having a particle diameter of 7 μm. The toner particles had a softening point of 73° C.

Formation of Copied Matter

The above thermochromic color-memory toner (previously cooled to develop the color of the microcapsule pigment) was placed in a cartridge.

The cartridge was set in a laser printer, and a document for meeting was copied to form a thermochromic image, whereby a thermochromic copied matter was obtained.

The copied matter was visually confirmed to carry thereon a pink thermochromic image at room temperature (25° C.). The thermochromic image was decolored upon heating to a temperature of 78° C. or higher and, at a room temperature (25° C.), the copied matter returned to the state before use (recording paper on which nothing is copied).

Again, a copied matter can be obtained by setting the recording paper in the laser printer and conducting copying procedures to thereby form a thermochromic image, whereby the recording paper was able to be used repeatedly.

Example 3

Preparation of Reversible Thermochromic Microcapsule Pigment

A solution obtained by uniformly dissolving under heating a thermochromic color-memory composition composed of 3.0 parts of 4-[2,6-bis(2-ethoxyphenyl)-4-pyridinyl]-N,N-dimethylbenzeneamine as component (A), 10.0 parts of 2,2-bis(4'-hydroxyphenyl)hexafluoropropane as component (B), and 50 parts of diester of pimelic acid and 2-(4-benzyloxyphenyl)ethanol as component (C) and blending 25.0 parts of an aromatic polyvalent isocyanate prepolymer as a wall membrane material and 50.0 parts of a co-solvent was emulsified and dispersed in a 8% polyvinyl alcohol aqueous solution into fine droplets, followed by continuous stirring under heating, and 2.5 parts of a water-soluble aliphatic modified amine was added thereto, followed by further continuous stirring to obtain a microcapsule pigment suspension.

The resulting suspension was subjected to centrifugation to isolate the microcapsule pigment.

The above microcapsule pigment has an average particle diameter of 2.5 μm, a complete decoloring temperature of 76° C., and a complete coloring temperature of −10° C., and undergoes discoloration from yellow to colorless due to change in temperature.

Preparation of Thermochromic Color-Memory Toner

After blending 15 parts of the above microcapsule pigment, 100 parts of a polyester resin having a softening point of 70° C. as a binder resin, and 3 parts of low molecular weight polyethylene as a release agent of, the resulting mixture was melt-kneaded in a twin-screw extruder at a kneading temperature of 90° C. Then, the product was solidified by cooling, followed by pulverizing and classifying to obtain a thermochromic color-memory toner having a particle diameter of 7 μm. The toner particles had a softening point of 73° C.

Formation of Copied Matter

The above thermochromic color-memory toner (previously cooled to develop the color of the microcapsule pigment) was placed in a cartridge.

The cartridge was set in a laser printer, and a document for meeting was copied to form a thermochromic image, whereby a thermochromic copied matter was obtained.

The copied matter was visually confirmed to carry thereon a yellow thermochromic image at room temperature (25° C.). The thermochromic image was decolored upon heating to a temperature of 76° C. or higher and, at a room temperature (25° C.), the copied matter returned to the state before use (recording paper on which nothing is copied).

Again, a copied matter can be obtained by setting the recording paper in the laser printer and conducting copying procedures to thereby form a thermochromic image, whereby the recording paper was able to be used repeatedly.

Example 4

Preparation of Reversible Thermochromic Microcapsule Pigment

A solution obtained by uniformly dissolving under heating a thermochromic color-memory composition composed of 1 part of 3-(2-ethoxy-4-diethylaminophenyl)-3-(1-ethyl-2-methylindol-3-yl)-4-azaphthalide as component (A), 5.0 parts of 2,2-bis(4'-hydroxyphenyl)hexafluoropropane as component (B), and 50 parts of diester of pimelic acid and 2-(4-benzyloxyphenyl)ethanol as component (C) and blending 25.0 parts of an aromatic polyvalent isocyanate prepolymer as a wall membrane material and 50.0 parts of a co-solvent was emulsified and dispersed in a 8% polyvinyl alcohol aqueous solution into fine droplets, followed by continuous stirring under heating, and 2.5 parts of a water-soluble aliphatic modified amine was added thereto, followed by further continuous stirring to obtain a microcapsule pigment suspension.

The resulting suspension was subjected to centrifugation to isolate the microcapsule pigment.

The above microcapsule pigment has an average particle diameter of 2.5 μm, a complete decoloring temperature of 79° C., and a complete coloring temperature of −10° C., and undergoes discoloration from blue to colorless due to change in temperature.

Preparation of Thermochromic Color-Memory Toner

After blending 15 parts of the above microcapsule pigment, 100 parts of a polyester resin having a softening point of 70° C. as a binder resin, and 3 parts of low molecular weight polyethylene as a release agent, the resulting mixture was melt-kneaded in a twin-screw extruder at a kneading temperature of 90° C. Then, the product was solidified by cooling, followed by pulverizing and classifying to obtain a thermochromic color-memory toner having a particle diameter of 7 μm. The toner particles had a softening point of 73° C.

Formation of Copied Matter

The above thermochromic color-memory toner (previously cooled to develop the color of the microcapsule pigment) was placed in a cartridge.

The cartridge was set on a laser printer, and a document for meeting was copied to form a thermochromic image, whereby a thermochromic copied matter was obtained.

The copied matter was visually confirmed to carry thereon a blue thermochromic image at room temperature (25° C.). The thermochromic image was decolored upon heating to a temperature of 79° C. or higher and, at a room temperature (25° C.), the copied matter returned to the state before use (recording paper on which nothing is copied).

Again, a copied matter can be obtained by setting the recording paper in the laser printer and conducting copying procedures to thereby form a thermochromic image, whereby the recording paper was able to be used repeatedly.

Example 5

Each of the thermochromic color-memory toners obtained in Examples 1 to 4 was placed in a cartridge.

The cartridge was set in a laser printer, and a photograph of landscape was copied to form a thermochromic image and obtain a thermochromic copied matter.

The copied matter was visually confirmed to carry thereon a multi-color thermochromic image at room temperature (25° C.). The thermochromic image was decolored upon heating to a temperature of 79° C. or higher and, at a room temperature (25° C.), the copied matter returned to the state before use (recording paper on which nothing is copied).

Again, a copied matter can be obtained by setting the recording paper in the laser printer and conducting copying procedures to thereby form a thermochromic image, whereby the recording paper was able to be used repeatedly.

Example 6

Figure 2:
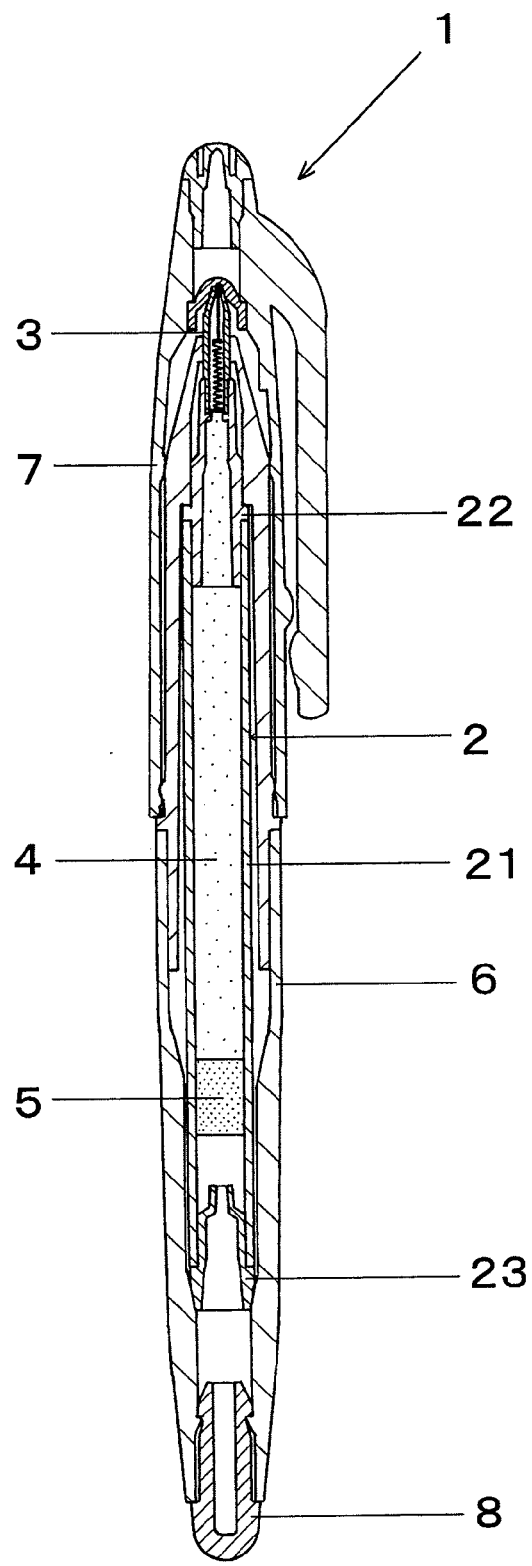
FIG. 2 is a longitudinal sectional view of one example of a writing instrument of the present invention.

Preparation of Writing Instrument (Referring to FIG. 2)

A suspension of a microcapsule pigment encapsulating a thermochromic color-memory composition composed of 1.0 part of 1,2-benz-6-(N-ethyl-N-isoamylamino) fluoran and 2.0 parts of 1,3-dimethyl-6-diethylaminofluoran as components (A), 4.5 parts of 4,4'-(2-methylpropylidene)bisphenol and 7.5 parts of 2,2-bis(4'-hydroxyphenyl) hexafluoropropane as components (B), and 50.0 parts of 4-benzyloxyphenylethyl caprate as component (C) was obtained.

The resulting suspension was subjected to centrifugation to isolate the microcapsule pigment.

The above microcapsule pigment has an average particle diameter of 2.5 μm, a complete decoloring temperature of 57° C., and a complete coloring temperature of −20° C., and undergoes discoloration from red to colorless due to change in temperature.

A reversible thermochromic aqueous ink composition was prepared by blending 25.7 parts of the above microcapsule pigment, 0.2 part of succinoglycan (shear thinning agent), 5.5 parts of urea, 7.5 parts of glycerin, 0.2 part of a modified silicone type antifoaming agent, 0.1 part of an antifungal agent, 1.0 part of a lubricant, 1.0 part of triethanolamine, and 58.8 parts of water.

A polypropylene-made pipe (an ink receiving tube 21) was filled by suction with the above ink 4 (previously cooled to −20° C. or lower to develop red color of the microcapsule pigment, then allowed to stand at room temperature) and was connected, via a resin-made holder 22, with a ball-point pen tip 3.

Next, an ink follower 5 (liquid plug) containing polybutene as a main component and having viscoelasticity was filled from the rear end of the polypropylene-made pipe, and a tail plug 23 was fitted in the rear portion of the pipe to form a refill 2. Further, the refill 2 was placed in an axle body 6 (composed of a front axle body and a rear axle body), a cap 7 was fitted thereto, and then degassing treatment was carried out by centrifugation, whereby a writing instrument 1 (ball-point pen) was obtained.

Incidentally, the above ball-point pen tip is made of a metal material and holds a cemented carbide ball of 0.5 mm in diameter in its ball-holding part formed by cutting the metal material with a drill, with the ball being pressed in the front direction by means of a spring body.

Also, an SEBS resin-made frictional member 8 is fitted to the rear axle body end.

The writing instrument and the cartridge obtained in Example 1 were combined to obtain a cartridge set.

The above cartridge was set on a laser printer, and a document for meeting was copied to form a thermochromic image, whereby a thermochromic copied matter was obtained.

On the copied matter, a black thermochromic image was visually observed at room temperature (25° C.), and red letters (handwriting) could be written on the copied matter using the above ball-point pen.

When part of the handwriting was rubbed by using the frictional member, it was decolored to become colorless.

When the copied matter was heated to 77° C. or higher, both the thermochromic image and the handwriting were decolored and returned to a state before use (recording paper on which nothing is copied) at a room temperature (25° C.).

Again, a copied matter can be obtained by setting the recording paper in the laser printer and conducting copying procedures to thereby form a thermochromic image, whereby the recording paper was able to be used repeatedly.

Example 7

Figure 3:
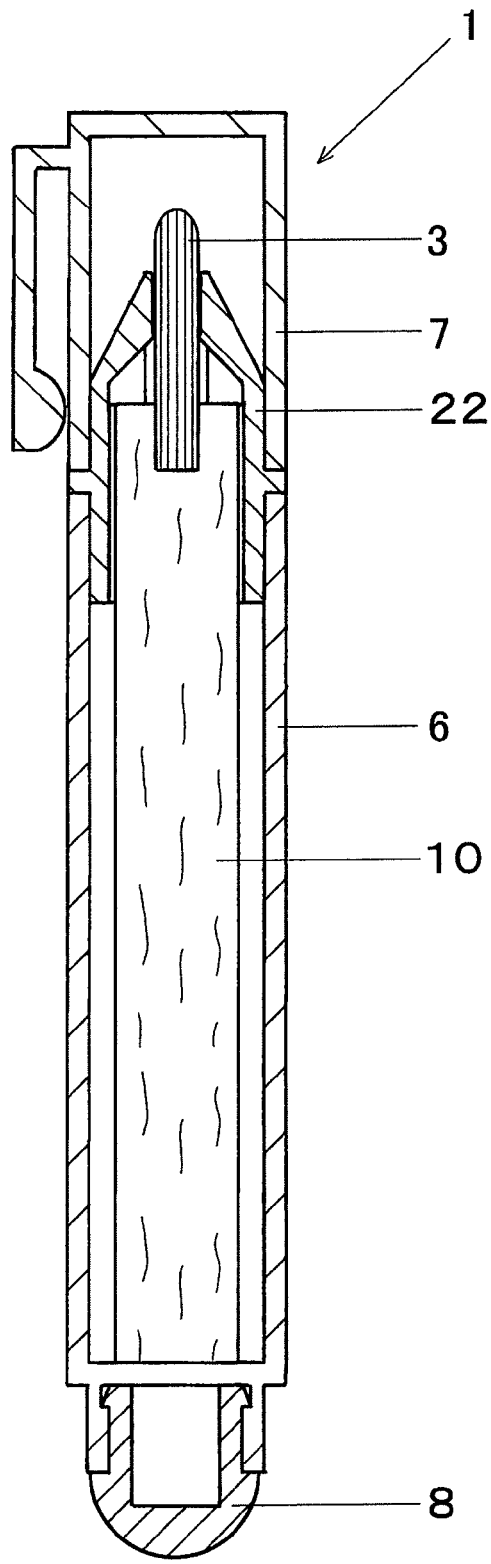
FIG. 3 is a longitudinal sectional view of another example of a writing instrument of the present invention.

Preparation of Writing Instrument (Referring to FIG. 3)

A suspension of a microcapsule pigment encapsulating a thermochromic color-memory composition composed of 2.0 parts of 4,5,6,7-tetrachloro-3-[4-(dimethylamino)-2-methylphenyl]-3-(1-ethyl-2-methyl-1H-indol-3-yl)-1(3H)-isobenzofuranon as component (A), 3.0 parts of 4,4'-(2-ethylhexane-1,1-diyl)diphenol and 5.0 parts of 2,2-bis(4'-hydroxyphenyl)-hexafluoropropane as components (B), and 50.0 parts of 4-benzyloxyphenylethyl caprate as component (C) was obtained.

The resulting suspension was subjected to centrifugation to isolate the microcapsule pigment.

The above microcapsule pigment has an average particle diameter of 2.5 μm, a complete decoloring temperature of 55° C., and a complete coloring temperature of −20° C., and undergoes discoloration from blue to colorless due to change in temperature.

A reversible thermochromic aqueous ink composition was prepared by blending 20.0 parts of the above microcapsule pigment (previously cooled to −20° C. or lower to develop blue color), 0.5 part of hydroxyethyl cellulose, 0.2 part of a polymer dispersant, 1.0 part of an antiseptic, 0.5 part of polyvinyl alcohol, 25.0 parts of glycerin, 0.02 part of an antifoaming agent, and 52.78 parts of water.

An ink occluding body 10 formed of a polyester sliver covered with a synthetic resin film was impregnated with the above ink composition, and was placed in a axle body 6 formed of a polypropylene resin, and connected, via a holder 22, with a marking pen tip 3 (cannonball form) made of resin-processed polyester fibers at a front end of the axle body, and a cap 7 was fitted to obtain a writing instrument 1 (marking pen).

An SEBS resin as a frictional member 8 was fitted to the axle body rear end.

The writing instrument and an image formation apparatus containing the toner obtained in Example 2 were combined to obtain an image formation apparatus set.

A document for meeting was copied by using the image formation apparatus to form a thermochromic image, whereby a thermochromic copied matter was obtained.

On the copied matter, a pink thermochromic image was visually observed at room temperature (25° C.), and blue letters (handwriting) could be written on the copied matter using the above marking pen.

When part of the handwriting was rubbed by using the frictional member, it was decolored to become colorless.

When the copied matter was heated to 78° C. or higher, both the thermochromic image and the handwriting were decolored and returned to a state before use (recording paper on which nothing is copied) at a room temperature (25° C.).

Again, a copied matter can be obtained by setting the recording paper in the laser printer and conducting copying procedures to thereby form a thermochromic image, whereby the recording paper was able to be used repeatedly.

Example 8

Figure 4:
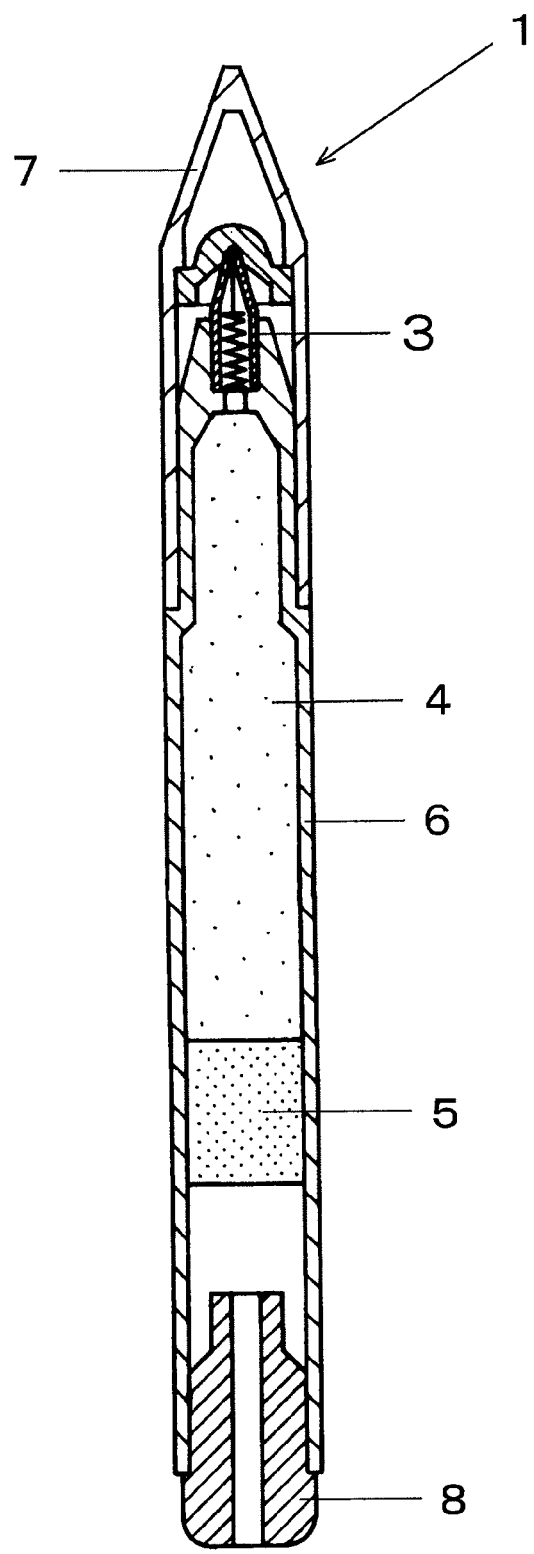
FIG. 4 is a longitudinal sectional view of still another example of a writing instrument of the present invention.

Preparation of Writing Instrument (Referring to FIG. 4)

A suspension of a microcapsule pigment encapsulating a thermochromic color-memory composition composed of 4.5 parts of 2-(2-chloroamino)-6-dibutylaminofluoran as component (A), 4.5 parts of 4,4'-(2-methylpropylidene)bisphenol and 7.5 parts of 2,2-bis(4'-hydroxyphenyl)-hexafluoropropane as components (B), and 50.0 parts of 4-benzyloxyphenylethyl caprate as component (C) was obtained.

The resulting suspension was subjected to centrifugation to isolate the microcapsule pigment.

The above microcapsule pigment has an average particle diameter of 2.5 μm, a complete decoloring temperature of 57° C., and a complete coloring temperature of −20° C., and undergoes discoloration from black to colorless due to change in temperature.

A reversible thermochromic aqueous ink composition was prepared by blending 25.7 parts of the above microcapsule pigment, 0.2 part of succinoglycan (shear thinning agent), 5.5 parts of urea, 7.5 parts of glycerin, 0.2 part of a modified silicone type antifoaming agent, 0.1 part of an antifungal agent, 1.0 part of a lubricant, 1.0 part of triethanolamine, and 58.8 parts of water.

A polypropylene-made axle body 6 of 7.0 mm in inside diameter and 10 mm in outside diameter fixedly fitted with a ball-point pen tip 3 at a front end thereof was filled with the above ink 4 (previously cooled to −20° C. or lower to develop black color of the microcapsule pigment, then allowed to stand at room temperature), and then an ink follower 5 containing polybutene as a main component and having viscoelasticity was filled therein, and an SEBS resin-made frictional member 8 was fitted to the axle body rear end.

Further, a cap 7 was fitted thereto, and degassing treatment was carried out by centrifugation, whereby a writing instrument (ball-point pen) 1 was obtained.

Incidentally, the above ball-point pen tip is made of a metal material and holds a cemented carbide ball of 0.7 mm in diameter in its ball-holding part formed by cutting the metal material with a drill, with the ball being pressed in the front direction by means of a spring body.

The writing instrument and an image formation apparatus containing the toner obtained in Example 1 were combined to obtain an image formation apparatus set.

A document for meeting was copied by using the image formation apparatus to form a thermochromic image, whereby a thermochromic copied matter was obtained.

On the copied matter, a black thermochromic image was visually observed at room temperature (25° C.), and black letters (handwriting) could be written on the copied matter using the above ball-point pen.

When part of the handwriting was rubbed by using the frictional member, it was decolored to become colorless.

When the copied matter was heated to 77° C. or higher, both the thermochromic image and the handwriting were decolored and returned to a state before use (recording paper on which nothing is copied) at a room temperature (25° C.).

Again, a copied matter can be obtained by setting the recording paper in the laser printer and conducting copying procedures to thereby form a thermochromic image, whereby the recording paper was able to be used repeatedly.

Example 9

Figure 5:
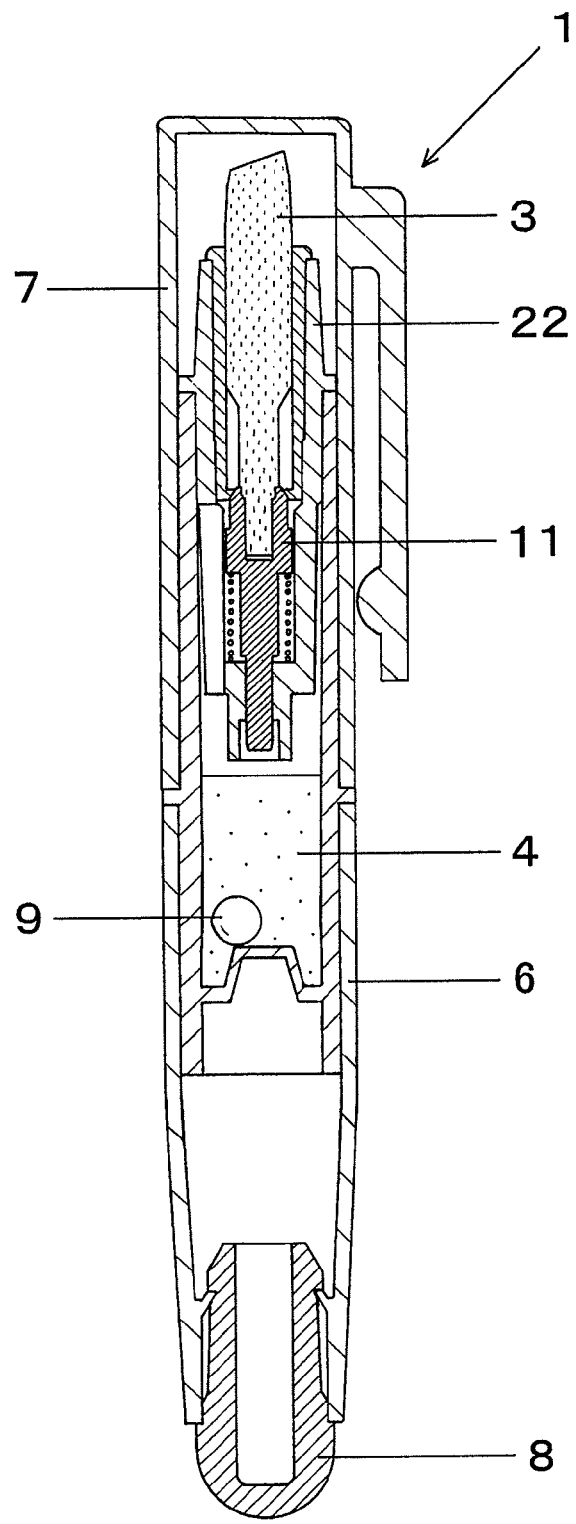
FIG. 5 is a longitudinal sectional view of still another example of a writing instrument of the present invention.

Preparation of Writing Instrument (Referring to FIG. 5)

A suspension of a microcapsule pigment encapsulating a thermochromic color-memory composition composed of 3.0 parts of 4-[2,6-bis(2-ethoxyphenyl)-4-puridinyl]-N,N-dimethylbenzeneamine as component (A), 10.0 parts of 2,2-bis(4'-hydroxyphenyl)-hexafluoropropane as component (B), and 50.0 parts of 4-benzyloxyphenylethyl caprate as component (C) was obtained.

The resulting suspension was subjected to centrifugation to isolate the microcapsule pigment.

The above microcapsule pigment has an average particle diameter of 2.5 μm, a complete decoloring temperature of 59° C., and a complete coloring temperature of −20° C., and undergoes discoloration from yellow to colorless due to change in temperature.

A reversible thermochromic aqueous ink composition was prepared by blending 25.0 parts of the above microcapsule pigment (previously cooled to −20° C. or lower to develop yellow color), 0.5 part of hydroxyethyl cellulose, 0.2 part of a polymer dispersant, 1.0 part of an antiseptic, 0.5 part of polyvinyl alcohol, 25.0 parts of glycerin, 0.02 part of an antifoaming agent, and 47.78 parts of water.

The above ink 4 and a stirring body 9 (SUS-304 ferrite type stainless steel ball; diameter: 3 mm) were placed in an axle body 6, and the axle body 6 was fitted, via a holder 22, with a marking pen tip 3 [chisel-type fibrous pen body (porosity: about 53%)] on a front end thereof, and a cap 7 was fitted to obtain a direct liquid type writing instrument 1 (marking pen).

Incidentally, a valve mechanism 11 is provided in the axle body, and the valve mechanism is a mechanism which is composed of a valve seat, a valve body, and a metal-made spring functioning to press the valve body against the valve seat, and which functions so that, upon writing, the valve opens due to writing pressure applied to a pen body.

An SEBS resin as a frictional member 8 was fitted to the axle body rear end.

The writing instrument and the cartridge set obtained in Example 4 were combined to obtain a cartridge set.

The above cartridge was set on a laser printer, and a document for meeting was copied to form a thermochromic image, whereby a thermochromic copied matter was obtained.

On the copied matter, a blue thermochromic image was visually observed at room temperature (25° C.), and yellow highlight could be formed on the image using the above marking pen.

When part of the handwriting was rubbed by using the frictional member, it was decolored to become colorless.

When the copied matter was heated to 79° C. or higher, both the thermochromic image and the highlight were decolored and returned to a state before use (recording paper on which nothing is copied) at a room temperature (25° C.).

Again, a copied matter can be obtained by setting the recording paper in the laser printer and conducting copying procedures to thereby form a thermochromic image, whereby the recording paper was able to be used repeatedly.

Example 10

Figure 6:
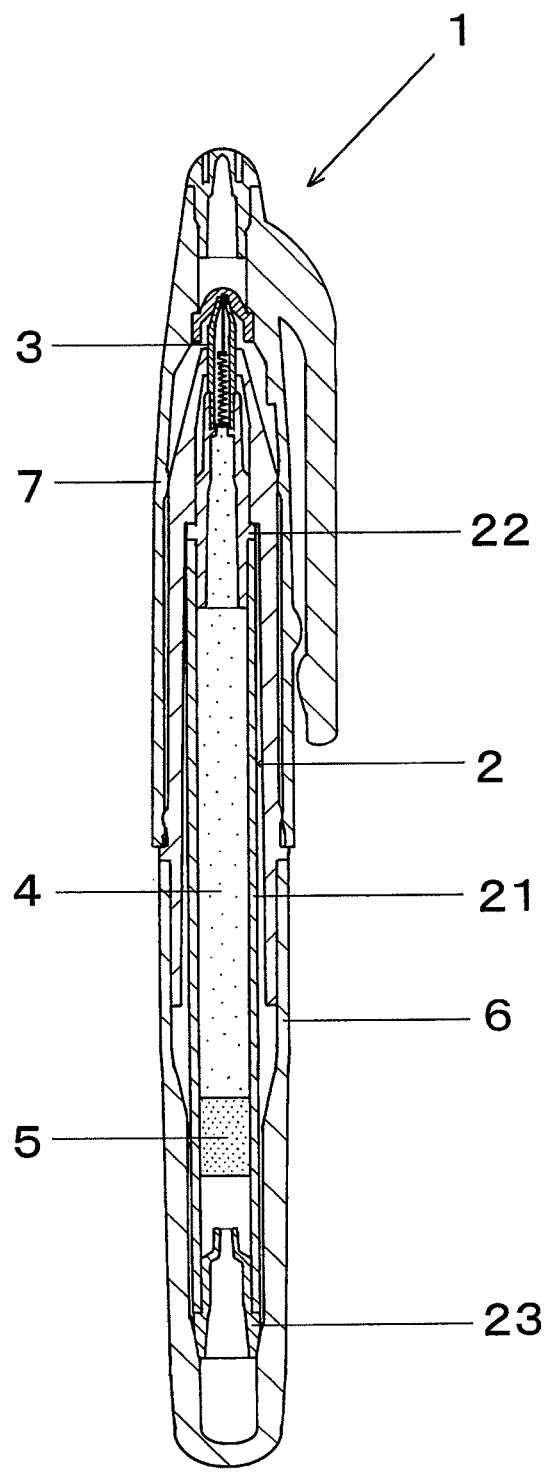
FIG. 6 is a longitudinal sectional view of yet another example of a writing instrument of the present invention.

Preparation of Writing Instrument (Referring to FIG. 6)

A suspension of a microcapsule pigment encapsulating a thermochromic color-memory composition composed of 1.5 parts of 2-(dibutylamino)-8-(dipentylamino)-4-methyl-spiro[5H-[1]benzopirano[2,3-g]pyrimidine-5,1'-(3'H)-isobenzofuran]-3-one as component (A), 5.0 parts of 2,2-bis(4'-hydroxyphenyl)hexafluoropropane as component (B), and 50.0 parts of diester of pimelic acid and 2-(4-benzyloxyphenyl)ethanolyl as component (C) was obtained.

The resulting suspension was subjected to centrifugation to isolate the microcapsule pigment.

The above microcapsule pigment has an average particle diameter of 2.5 μm, a complete decoloring temperature of 78° C., and a complete coloring temperature of −11° C., and undergoes discoloration from pink to colorless due to change in temperature.

A reversible thermochromic aqueous ink composition was prepared by blending 25.7 parts of the above microcapsule pigment, 0.2 part of succinoglycan (shear thinning agent), 5.5 parts of urea, 7.5 parts of glycerin, 0.2 part of modified silicone type antifoaming agent, 0.1 part of an antifungal agent, 1.0 part of a lubricant, 1.0 part of triethanolamine, and 58.8 parts of water.

A polypropylene-made pipe (an ink receiving tube 21) was filled by suction with the above ink 4 (previously cooled to −11° C. or lower to develop pink color of the microcapsule pigment, then allowed to stand at room temperature) and was connected, via a resin-made holder 22, with a ball-point pen tip 3.

Next, an ink follower 5 (liquid plug) containing polybutene as a main component and having viscoelasticity was filled from the rear end of the polypropylene-made pipe, and a tail plug 23 was fitted in the rear portion of the pipe to form a refill 2. Further, the refill 2 was placed in an axle body 6 (composed of a front axle body and a rear axle body), a cap 7 was fitted thereto, and then degassing treatment was carried out by centrifugation, whereby a writing instrument 1 (ball-point pen) was obtained.

Incidentally, the above ball-point pen tip is made of a metal material and holds a cemented carbide ball of 0.5 mm in diameter in its ball-holding part formed by cutting the metal material with a drill, with the ball being pressed in the front direction by means of a spring body.

The writing instrument and the cartridge obtained in Example 1 were combined to obtain a cartridge set.

The above cartridge was set on a laser printer, and a document for meeting was copied to form a thermochromic image, whereby a thermochromic copied matter was obtained.

On the copied matter, a black thermochromic image was visually observed at room temperature (25° C.), and pink letters (handwriting) could be written on the copied matter using the above ball-point pen.

When copied matter was heated to 77° C. or higher, both the thermochromic image and the handwriting were decolored and returned to a state before use (recording paper on which nothing is copied) at a room temperature (25° C.).

Again, a copied matter can be obtained by setting the recording paper in the laser printer and conducting copying procedures to thereby form a thermochromic image, whereby the recording paper was able to be used repeatedly.

Example 11

Each of the thermochromic color-memory toners obtained in Examples 1 to 4 (previously cooled to develop a color of each microcapsule pigment) was placed in a cartridge.

The writing instrument obtained in Example 8 was combined with the above cartridge to obtain a cartridge set.

The cartridge was set on a laser printer, and a document for meeting was copied to form a colorful thermochromic image, whereby a thermochromic copied matter was obtained.

A black handwriting could be formed on the copied matter by using the above writing instrument.

When part of the handwriting was rubbed by using the frictional member, it was decolored to become colorless.

When the copied matter was heated to 79° C. or higher, both the thermochromic image and the handwriting were decolored and returned to a state before use (recording paper on which nothing is copied) at a room temperature (25° C.).

Again, a copied matter can be obtained by setting the recording paper in the laser printer and conducting copying procedures to thereby form a thermochromic image, whereby the recording paper was able to be used repeatedly.

Example 12

The cartridge obtained in Example 1 was combined with the writing instruments obtained in Examples 6 to 9 to obtain a cartridge set.

The cartridge was set in a laser printer, and a document for meeting was copied to form a black thermochromic image, whereby a thermochromic copied matter was obtained.

Red, blue, black, and yellow handwritings could be formed on the above copied matter by using the above writing instruments.

When part of the handwritings was rubbed by using the frictional member, they were decolored to become colorless.

When the copied matter was heated to 77° C. or higher, both the thermochromic image and the handwritings were decolored and returned to a state before use (recording paper on which nothing is copied) at a room temperature (25° C.).

Again, a copied matter can be obtained by setting the recording paper in the laser printer and conducting copying procedures to thereby form a thermochromic image, whereby the recording paper was able to be used repeatedly.

Example 13

Each of the thermochromic color-memory toners of Examples 1 to 4 (previously cooled to develop a color of each microcapsule pigment) was placed in a cartridge.

The writing instruments obtained in Examples 6 to 9 were combined with the above cartridge to obtain a cartridge set.

The cartridge was set in a laser printer, and a document for meeting was copied to form a colorful thermochromic image, whereby a thermochromic copied matter was obtained.

Red, blue, black, and yellow handwritings could be formed on the copied matter by using the above writing instruments.

When a part of the handwritings was rubbed by using the frictional member, they were decolored to become colorless.

When the copied matter was heated to 79° C. or higher, both the thermochromic image and the handwritings were decolored and returned to a state before use (recording paper on which nothing is copied) at a room temperature (25° C.).

Again, a copied matter can be obtained by setting the recording paper in the laser printer and conducting copying procedures to thereby form a thermochromic image, whereby the recording paper was able to be used repeatedly.

Example 14

Preparation of Reversible Thermochromic Microcapsule Pigment

A solution obtained by uniformly dissolving under heating a thermochromic color-memory composition composed of 1 part of 3-(2-ethoxy-4-diethylaminophenyl)-3-(1-ethyl-2-methylindol-3-yl)-4-azaphthalide as component (A), 3.0 parts of 2,2-bis(4'-hydroxyphenyl)hexafluoropropane and 3.0 parts of 1,1-bis(4-hydroxyphenyl)-n-decane as components (B), and 50 parts of diester of 1,4-bis(2-hydroxyethoxy)benzene and caproic acid as component (C) and blending 25.0 parts of an aromatic polyvalent isocyanate prepolymer as a wall membrane material and 50.0 parts of a co-solvent was emulsified and dispersed in a 8% polyvinyl alcohol aqueous solution into fine droplets, followed by continuous stirring under heating, and 2.5 parts of a water-soluble aliphatic modified amine was added thereto, followed by further continuous stirring to obtain a microcapsule pigment suspension.

The resulting suspension was subjected to centrifugation to isolate the microcapsule pigment.

The above microcapsule pigment has an average particle diameter of 2.5 μm, a complete decoloring temperature of 80° C., and a complete coloring temperature of −7° C., and undergoes discoloration from blue to colorless state due to change in temperature.

Preparation of Thermochromic Color-Memory Toner

After blending 15 parts of the above microcapsule pigment, 100 parts of a polyester resin having a softening point of 73° C. as a binder resin, and 3 parts of low molecular weight polyethylene as a release agent, the resulting mixture was melt-kneaded in a twin-screw extruder at a kneading temperature of 90° C. Then, the product was solidified by cooling, followed by pulverizing and classifying to obtain a thermochromic color-memory toner having a particle diameter of 7 μm. The toner particles had a softening point of 77° C.

Formation of Copied Matter

The above thermochromic color-memory toner (previously cooled to develop the color of the microcapsule pigment) was placed in a cartridge.

The cartridge was set in a laser printer, and a document for meeting was copied to form a thermochromic image, whereby a thermochromic copied matter was obtained.

The copied matter was visually confirmed to carry thereon a blue thermochromic image at room temperature (25° C.). The thermochromic image was decolored upon heating to a temperature of 80° C. or higher and, at a room temperature (25° C.), the copied matter returned to the state before use (recording paper on which nothing is copied).

Again, a copied matter can be obtained by setting the recording paper on the laser printer and conducting copying procedures to thereby form a thermochromic image, whereby the recording paper was able to be used repeatedly.

Industrial Applicability

The present invention can provide a convenient thermochromic color-memory toner which can produce a reversible discoloration with showing a wide hysteresis width (ΔH) with respect to color density-temperature curve and has a function of capable of keeping the image formed on a copied matter either in a colored state or in a decolored state, a cartridge including the toner housed therein, an image formation apparatus, a cartridge set, and an image formation apparatus set.

While the present invention has been described in detail and with reference to the specific embodiments thereof, it will be apparent to those skilled in the art that various changes and modifications can be made therein without departing from the spirit and scope thereof.

The present application is based on Japanese Patent Application No. 2008-126691 filed on May 14, 2008 and Japanese patent Application No. 2008-209565 filed on Aug. 18, 2008, and the entire contents thereof are incorporated herein by reference.

DESCRIPTION OF REFERENCE NUMERALS AND SIGNS $t_1$: Complete coloring temperature of a microcapsule pigment encapsulating a thermochromic color-memory composition, $t_2$: Coloring starting temperature of a microcapsule pigment encapsulating a thermochromic color-memory composition, $t_3$: Decoloring starting temperature of a microcapsule pigment encapsulating a thermochromic color-memory composition,
$t_4$: Complete decoloring temperature of a microcapsule pigment encapsulating a thermochromic color-memory composition,
ΔH: Hysteresis width,
1: Writing instrument,
2: Refill,
21: Ink receiving tube,
22: Holder,
23: Tail plug,
3: Tip,
4: Ink,
5: Ink follower,
6: Axle body,
7: Cap,
8: Frictional member,
9: Stirring member,
10: Ink occlusion body
11: Valve mechanism.

The invention claimed is:

1. A thermochromic color-memory toner comprising: at least a microcapsule pigment encapsulating a thermochromic color-memory composition comprising (A) an electron donating coloring organic compound, (B) an electron accepting compound, and (C) a reaction medium controlling color reaction between the above (A) and (B); and a binder resin,
   wherein the microcapsule pigment shows a large hysteresis characteristic with respect to color density-temperature curve and shows alternativeness between a colored state and a decolored state,
   the hysteresis characteristic is that, in a temperature-rise process where the pigment is in the colored state, decoloration starts when the temperature reaches temperature $t_3$, the pigment completely reaches the decolored state at temperature $t_4$ which is higher than temperature $t_3$ and the completely decolored state is maintained in a temperature region of equal to or higher than the temperature $t_4$ and, in a temperature-drop process where the pigment is in the decolored state, coloration starts when the temperature reaches temperature $t_2$ which is lower than temperature $t_3$ and the pigment completely reaches the colored state at temperature $t_1$ which is lower than temperature $t_2$ and the completely colored state is maintained in a temperature region of equal to or lower than the temperature $t_1$, with either the colored state or the decolored state being selectively observed visually in a temperature region between temperature $t_2$ and temperature $t_3$,
   the temperature $t_1$ is in a range of from −50 to 0° C. and the temperature $t_4$ is in a range of from 70 to 150° C., and
   the temperature $t_4$ of the microcapsule pigment is higher temperature than a softening point of the toner.

2. The thermochromic color-memory toner according to claim 1, wherein the microcapsule pigment has a hysteresis width (ΔH) of 50° C. to 100° C. with respect to the color density-temperature curve.

3. The thermochromic color-memory toner according to claim 1, wherein the softening point (S) of the toner and temperature $t_4$ of the microcapsule pigment satisfy the following formula (1):

$$60° C. \leq S + 3° C. < t_4 \qquad (1).$$

4. A cartridge comprising the thermochromic color-memory toner according to claim 1 housed in a container.

5. An image formation apparatus comprising the cartridge according to claim 4 housed therein.

6. A cartridge set comprising:
   the cartridge according to claim 4 and
   a writing instrument,
   wherein the writing instrument comprises in an axle body an ink composition containing a colorant capable of being decolored upon heating and the writing instrument has a pen body at a writing front end.

7. The cartridge set according to claim 6, wherein the colorant capable of being decolored upon heating is a microcapsule pigment encapsulating a thermochromic color-memory composition comprising (A) an electron donating coloring organic compound; (B) an electron accepting compound; and (C) a reaction medium controlling color reaction between the above (A) and (B),
   wherein the microcapsule pigment contained in the ink composition shows a large hysteresis characteristic with respect to color density-temperature curve and shows alternativeness between a colored state and a decolored state,
   the hysteresis characteristic of the microcapsule pigment contained in the ink composition is that, in a temperature-rise process where the pigment is in the colored state, decoloration starts when the temperature reaches temperature $t_3$ and the pigment completely reaches the decolored state in a temperature region of equal to or higher than temperature $t_4$ which is higher than temperature $t_3$, and, in a temperature-drop process where the pigment is in the decolored state, coloration starts when the temperature reaches temperature $t_2$ which is lower than temperature $t_3$ and the pigment completely reaches the colored state in a temperature region of equal to or lower than temperature $t_1$ which is lower than temperature $t_2$, with either the colored state or the decolored state being selectively observed visually in a temperature region between temperature $t_2$ and temperature $t_3$, and
   the temperature $t_1$ is in a range of from −50 to 0° C. and the temperature $t_4$ is in a range of from 50 to 150° C.

8. The cartridge set according to claim 7, wherein temperature $t_4$ is in a range of from 50 to 95° C. and which further comprises a frictional member.

9. An image formation apparatus comprising the thermochromic color-memory toner according to claim 1 housed therein.

10. An image formation apparatus set comprising:
    the image formation apparatus according to claim 9 and
    a writing instrument,
    wherein the writing instrument comprises in an axle body an ink composition containing a colorant capable of being decolored upon heating, and the writing instrument has a pen body at a writing front end.

11. The image formation apparatus set according to claim 10, wherein the colorant capable of being decolored upon heating is a microcapsule pigment encapsulating a thermochromic color-memory composition comprising (A) an electron donating coloring organic compound; (B) an electron accepting compound; and (C) a reaction medium controlling color reaction between the above (A) and (B),
   wherein the microcapsule pigment contained in the ink composition shows a large hysteresis characteristic with respect to color density-temperature curve and shows alternativeness between a colored state and a decolored state,
   the hysteresis characteristic of the microcapsule pigment contained in the ink composition is that, in a temperature-rise process where the pigment is in the colored state, decoloration starts when the temperature reaches temperature $t_3$ and the pigment completely reaches the decolored state in a temperature region of equal to or higher than temperature $t_4$ which is higher than temperature $t_3$, and, in a temperature-drop process where the pigment is in the decolored state, coloration starts when the temperature reaches temperature $t_2$ which is lower than temperature $t_3$ and the pigment completely reaches the colored state in a temperature region of equal to or lower than temperature $t_1$ which is lower than temperature $t_2$, with either the colored state or the decolored state being selectively observed visually in a temperature region between temperature $t_2$ and temperature $t_3$, and the temperature $t_1$ is in a range of from -50 to 0° C. and the temperature $t_4$ is in a range of from 50 to 150° C.

12. The image formation apparatus set according to claim 11, wherein temperature $t_4$ is in a range of from 50 to 95° C. and which further comprises a frictional member.

* * * * *